Nov. 30, 1965     R. H. FRYKHULT     3,220,340
APPARATUS FOR DEWATERING LIQUID-CONTAINING MATERIAL
COMPOSITION, PREFERABLY FIBROUS PULP SUSPENSIONS
Filed Sept. 27, 1963     14 Sheets-Sheet 3

Nov. 30, 1965     R. H. FRYKHULT     3,220,340
APPARATUS FOR DEWATERING LIQUID-CONTAINING MATERIAL
COMPOSITION, PREFERABLY FIBROUS PULP SUSPENSIONS
Filed Sept. 27, 1963     14 Sheets-Sheet 4
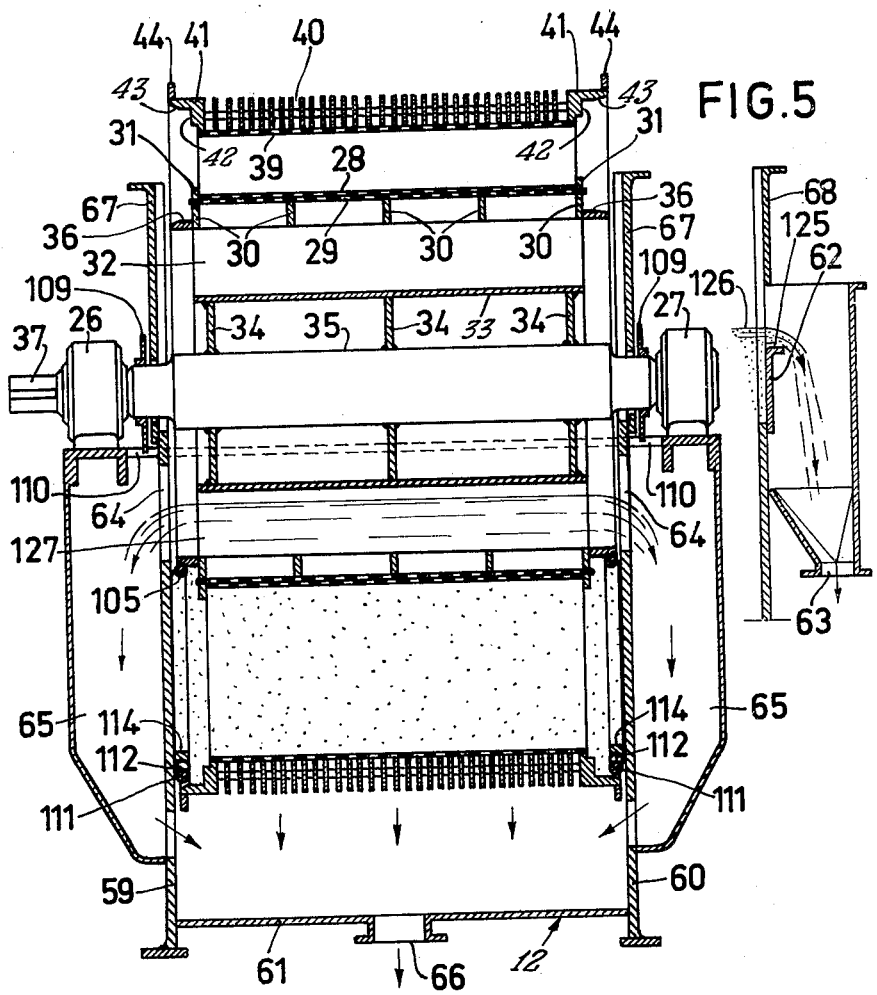

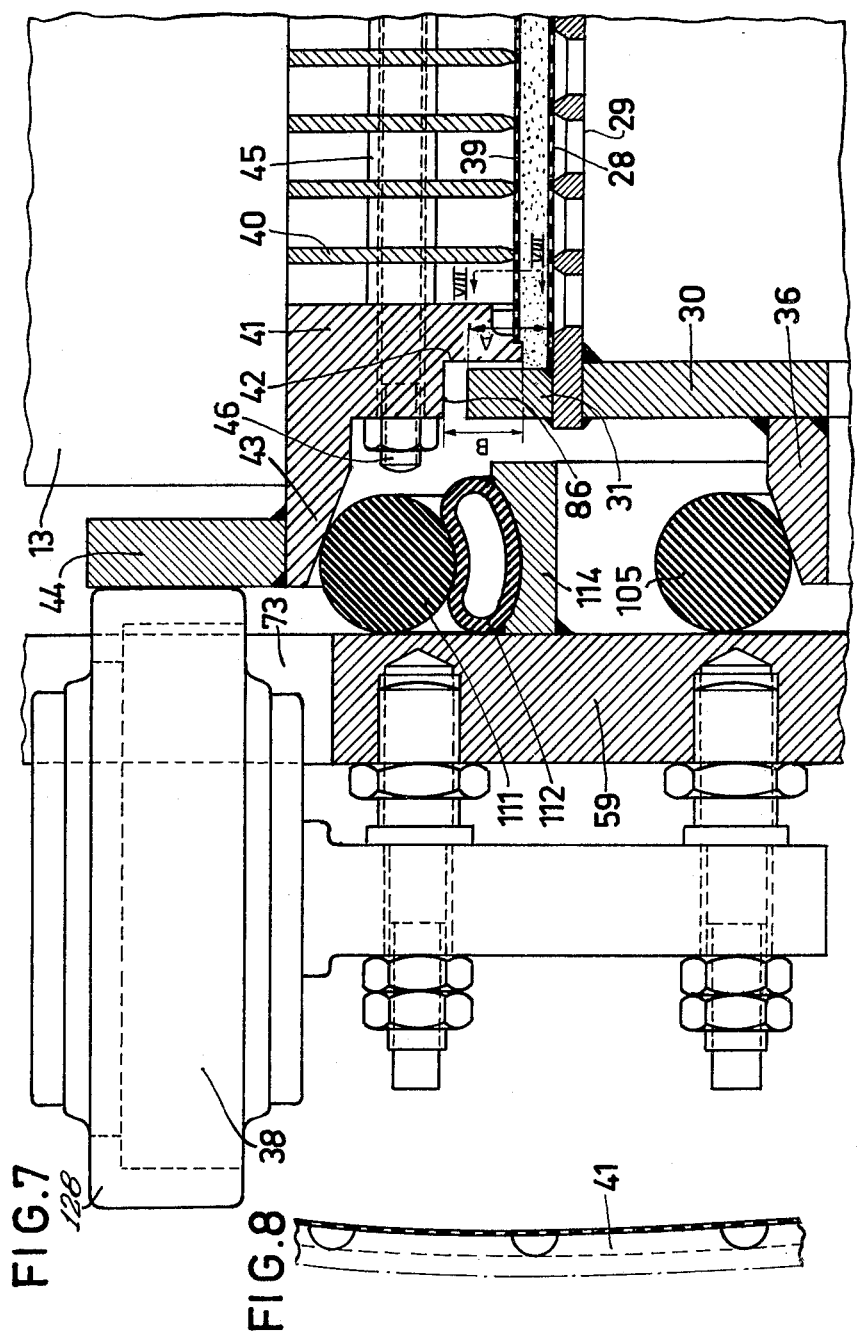

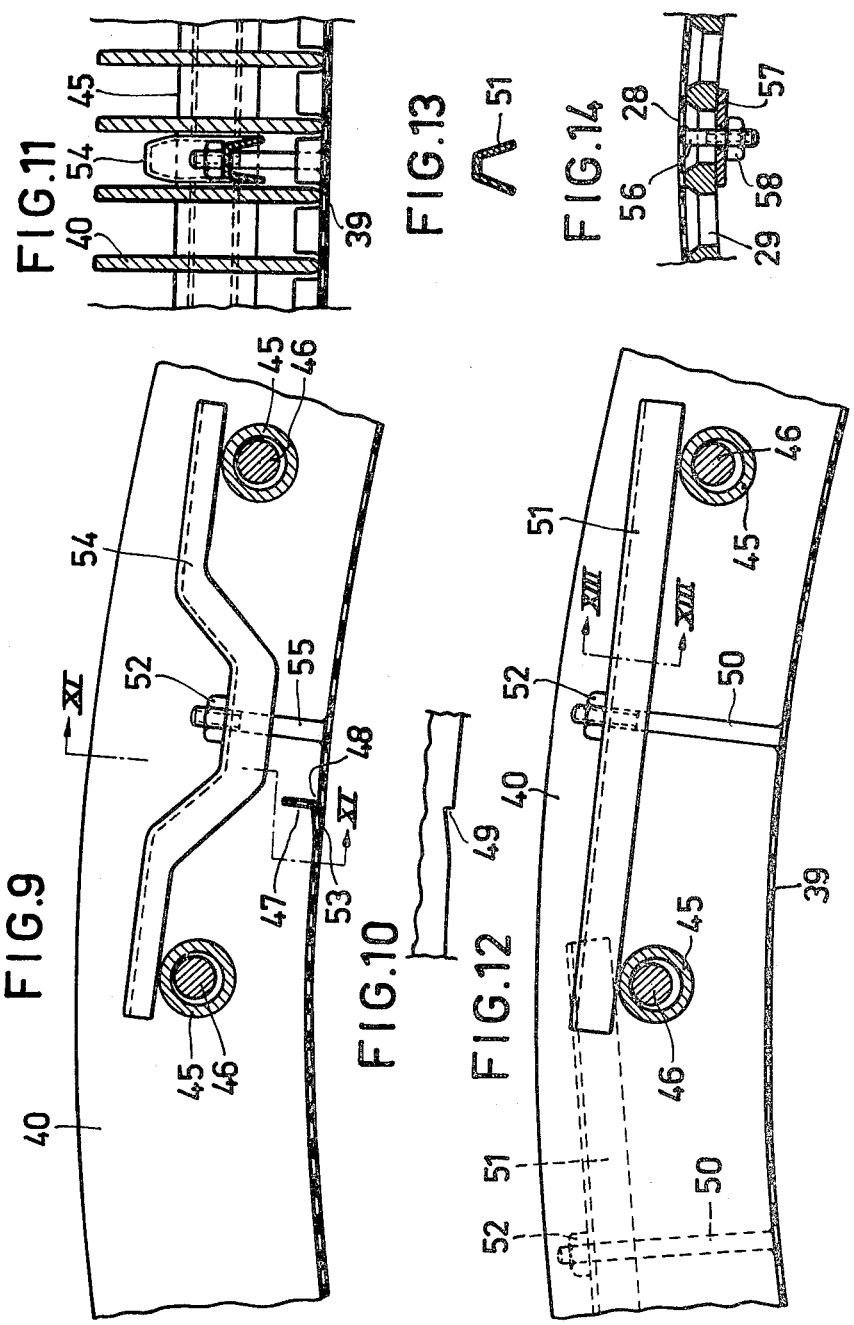

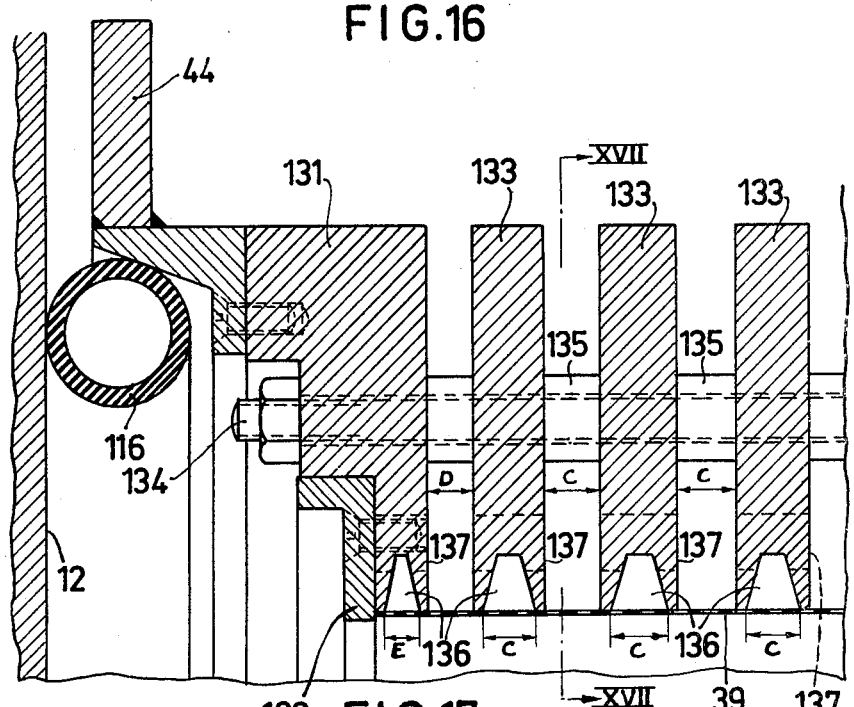
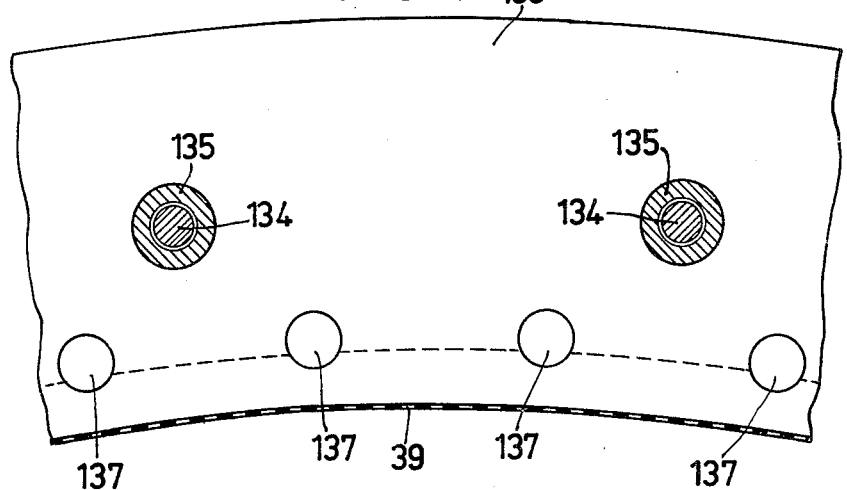

Nov. 30, 1965    R. H. FRYKHULT    3,220,340
APPARATUS FOR DEWATERING LIQUID-CONTAINING MATERIAL
COMPOSITION, PREFERABLY FIBROUS PULP SUSPENSIONS
Filed Sept. 27, 1963    14 Sheets-Sheet 10
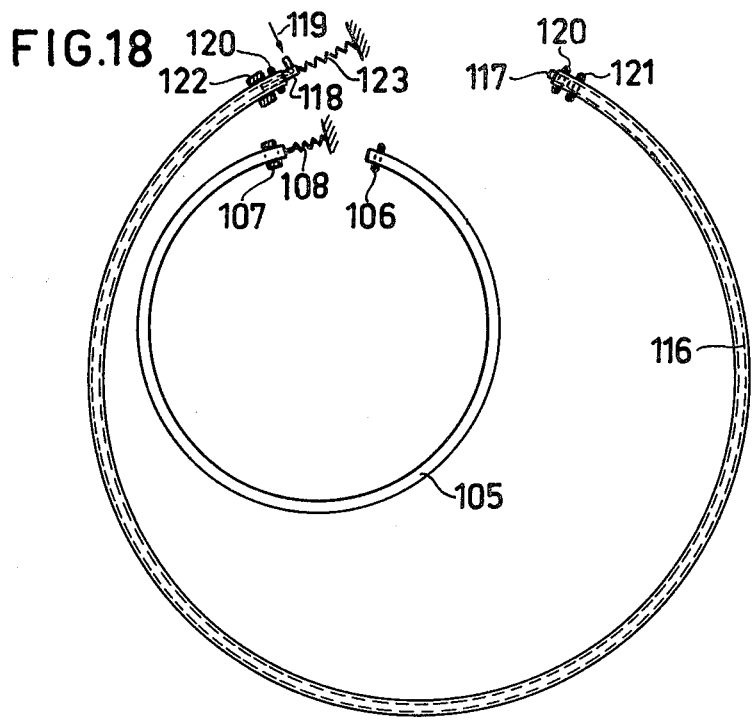
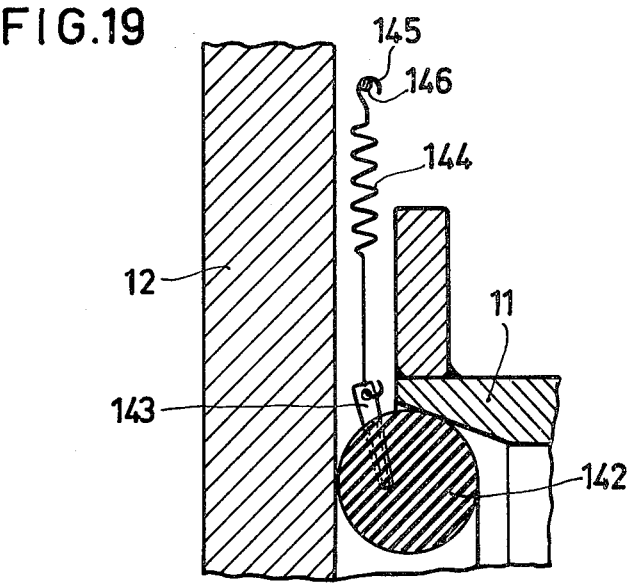

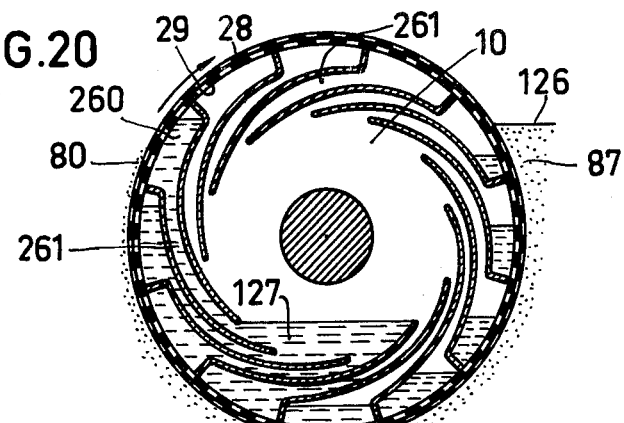
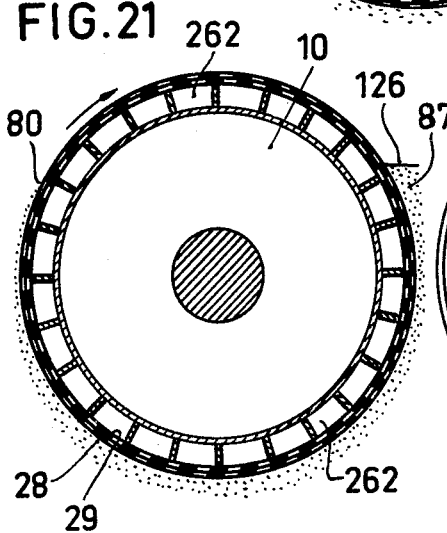
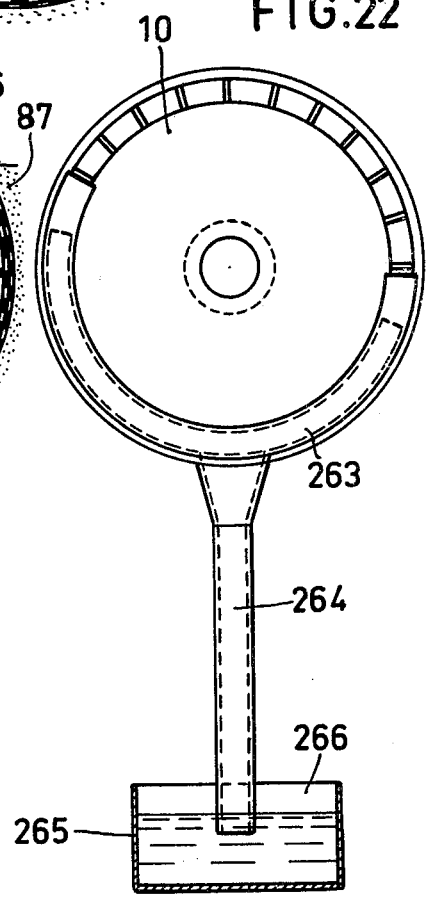

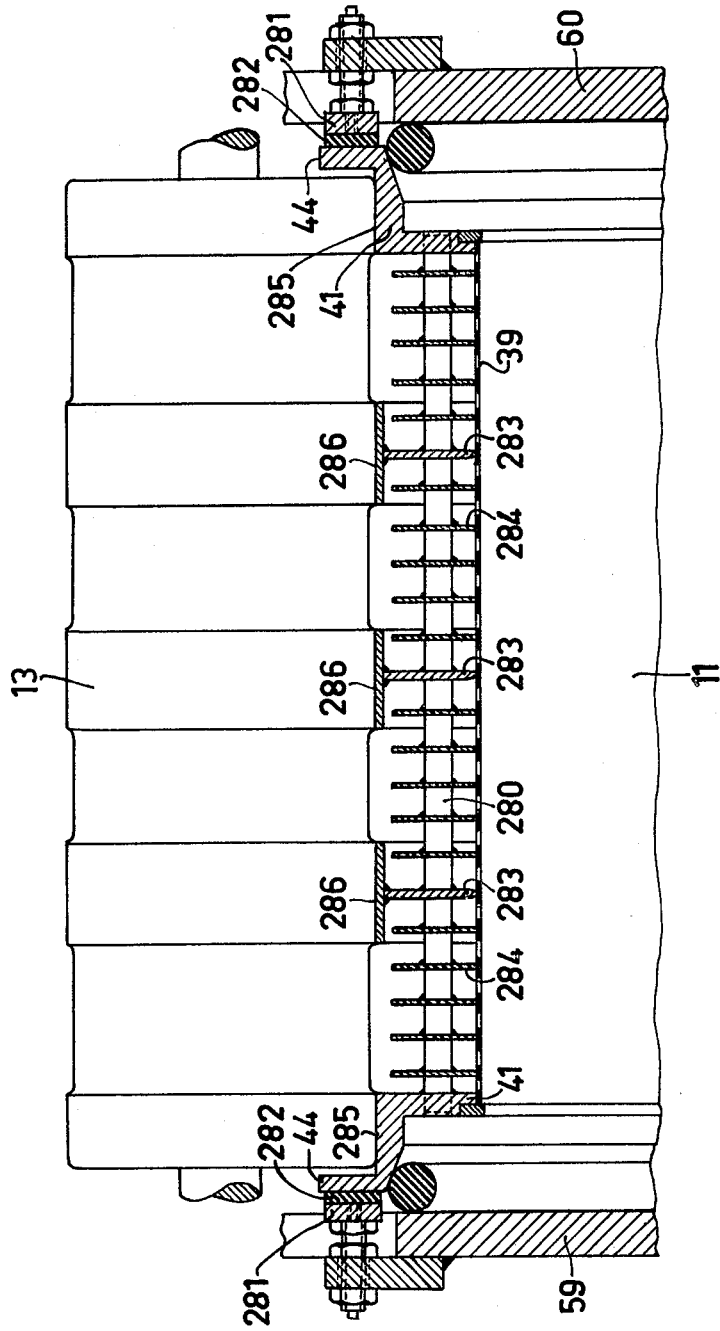

United States Patent Office 3,220,340
Patented Nov. 30, 1965

3,220,340
APPARATUS FOR DEWATERING LIQUID-CONTAINING MATERIAL COMPOSITION, PREFERABLY FIBROUS PULP SUSPENSIONS
Rune Helmer Frykhult, Johanneshov, Sweden, assignor to Aktiebolaget A. Ekströms Maskinaffär, Stockholm, Sweden, a Swedish joint-stock company
Filed Sept. 27, 1963, Ser. No. 312,219
Claims priority, application Sweden, Sept. 28, 1962, 10,481/62
14 Claims. (Cl. 100—121)

This invention relates to an apparatus for dewatering liquid-containing material compositions, preferably fibrous pulp suspensions.

The apparatus according to the invention can substantially be defined as a combination of a filtering device and a pressing device equipped with two rotary screen drums whereof one is disposed within the other.

It is the object of the invention to produce an apparatus the general construction of which is both simple, practical and inexpensive and which renders possible dewatering of a very high grade (the apparatus according to the invention is intended to produce normally fibrous pulp suspensions having an outgoing dry content of 35–50%). The invention aims particularly at preventing "rewatering" after the nip and further to achieve high reliability of operation by the arrangement of simple sealing means, so that the apparatus constitutes a suitable component in continuous processes.

An expedient embodiment of the invention will be described in the following, reference being had to the accompanying drawings.

FIG. 4 shows a longitudinal section along the line IV—IV in FIG. 2,

FIG. 5 shows a detail along the line V—V in FIG. 2,

Figure 1:
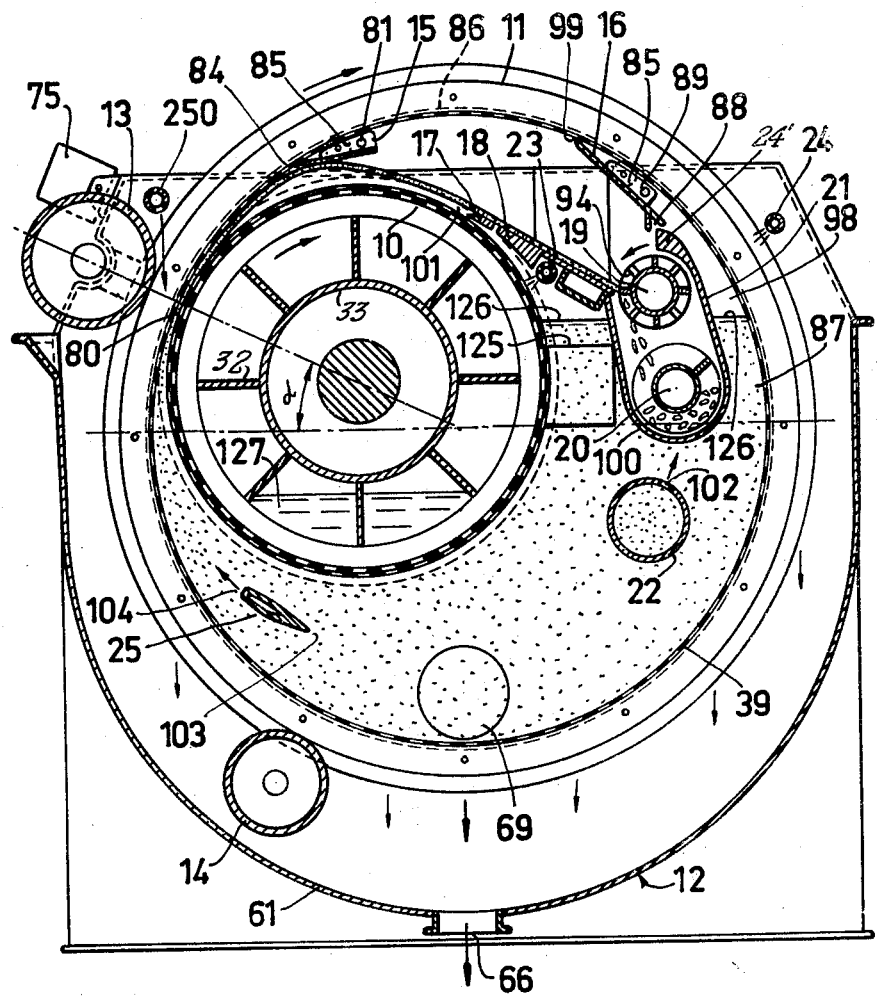
FIG. 1 shows a cross-section along the line I—I in FIG. 6.
Figure 2:
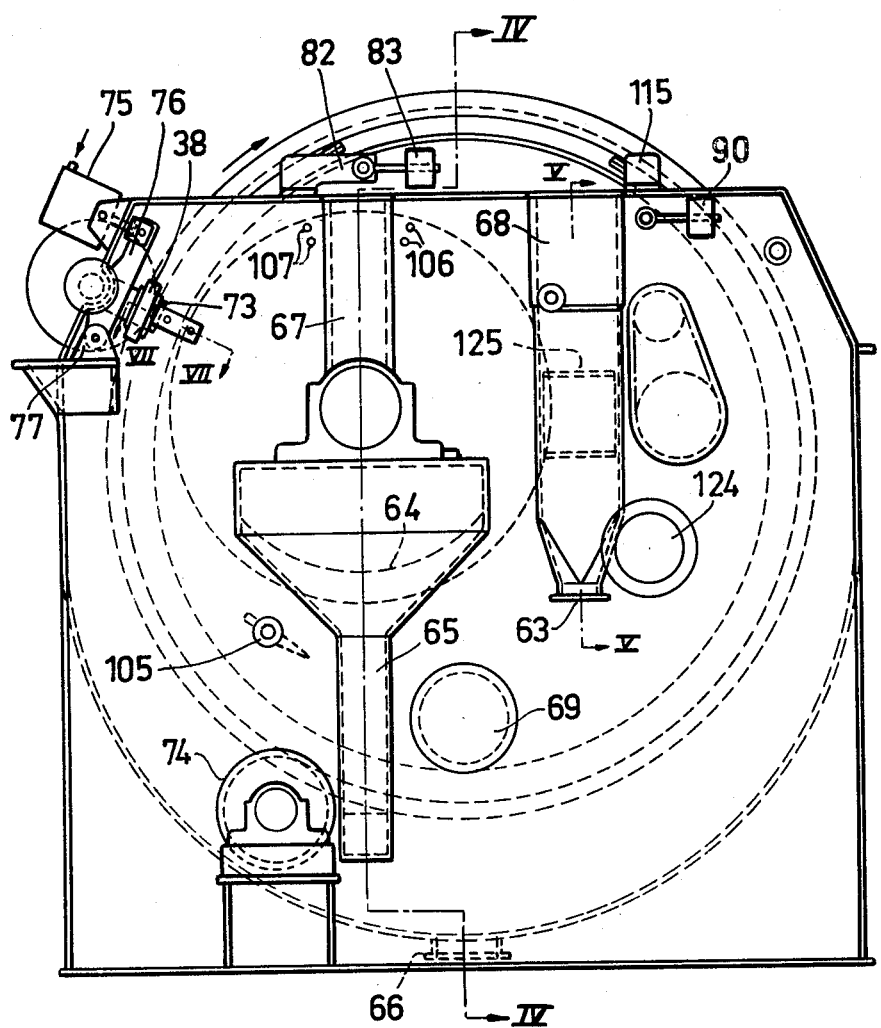
FIGS. 2 and 3 show end views.
Figure 6:
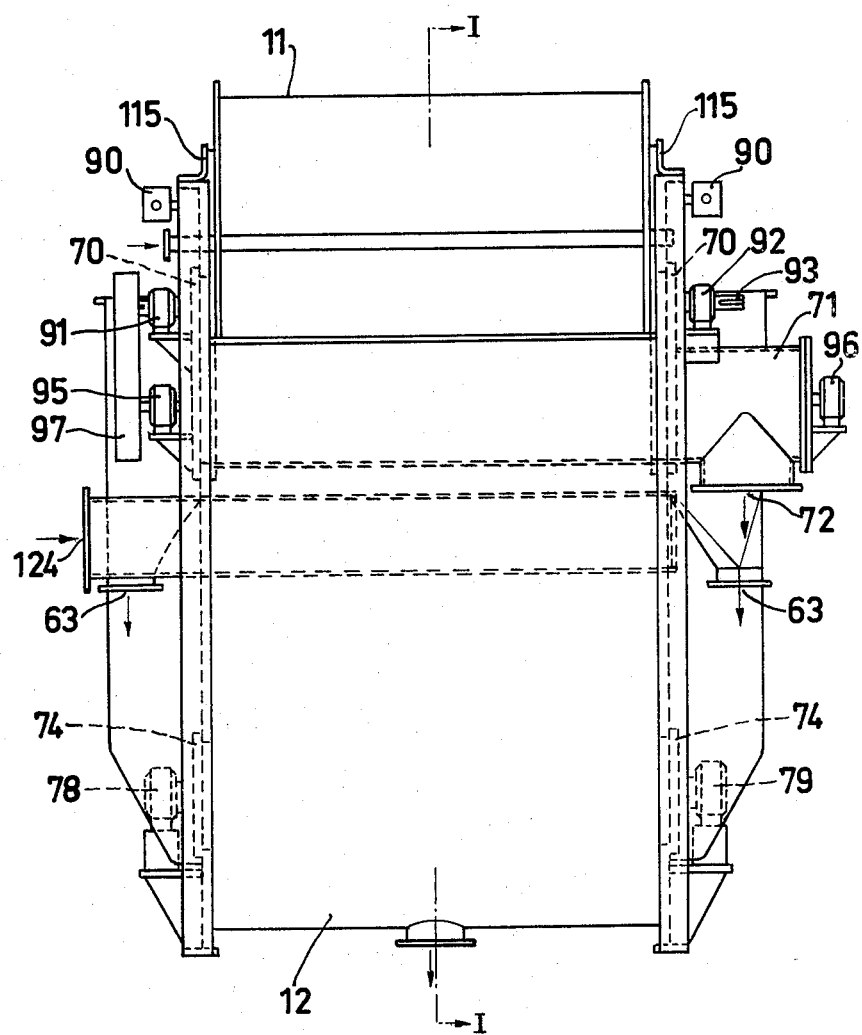
Figure 15:
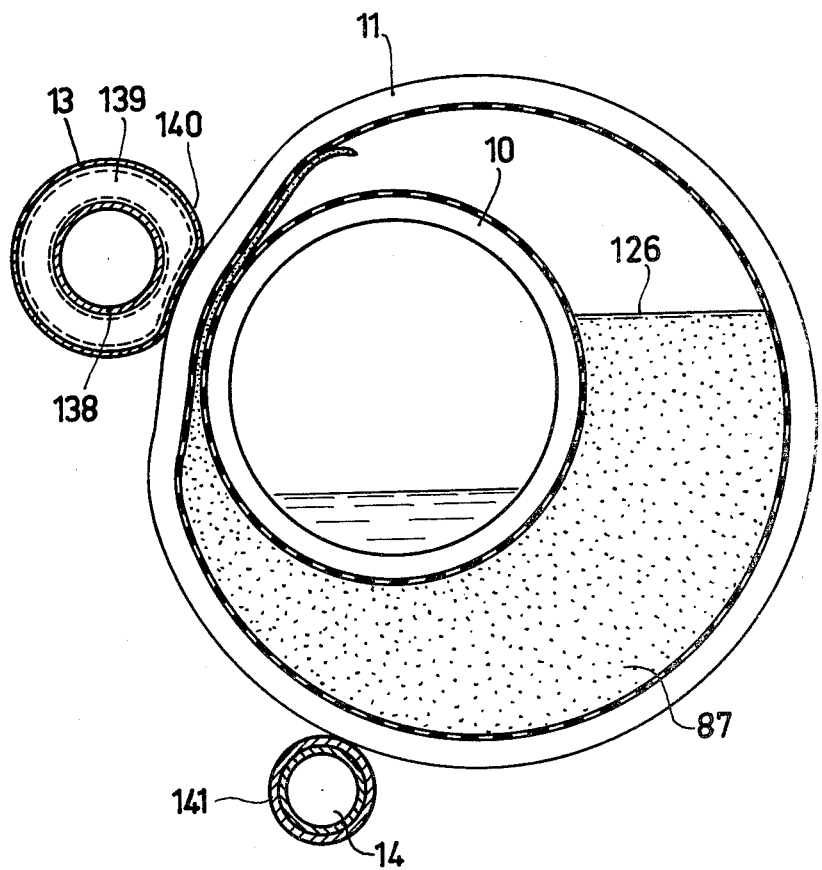
Figure 23:
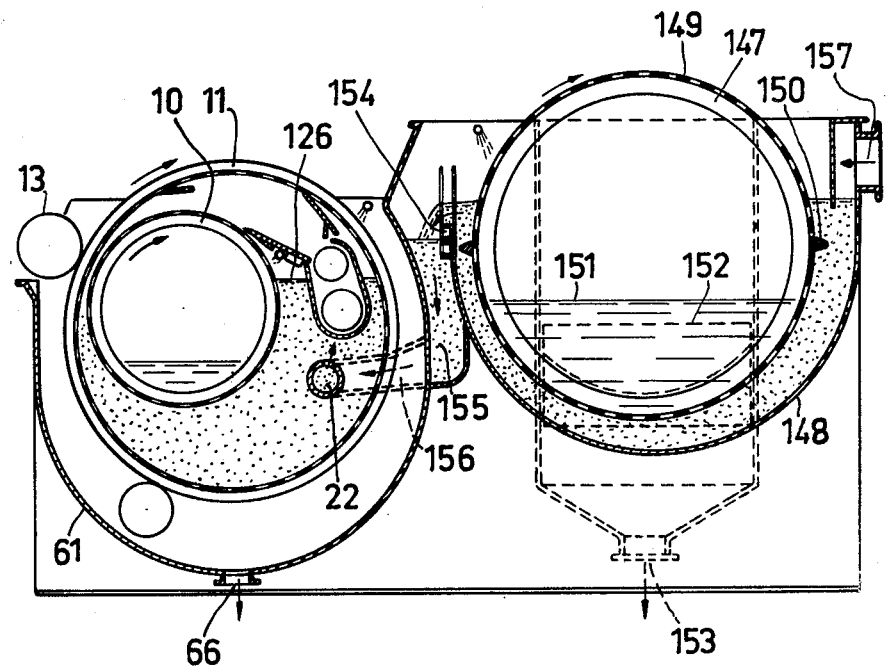
Figure 24:
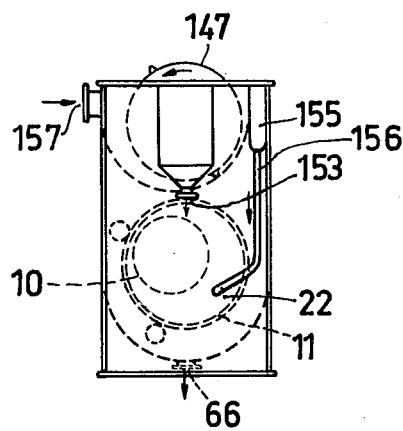
Figure 25:
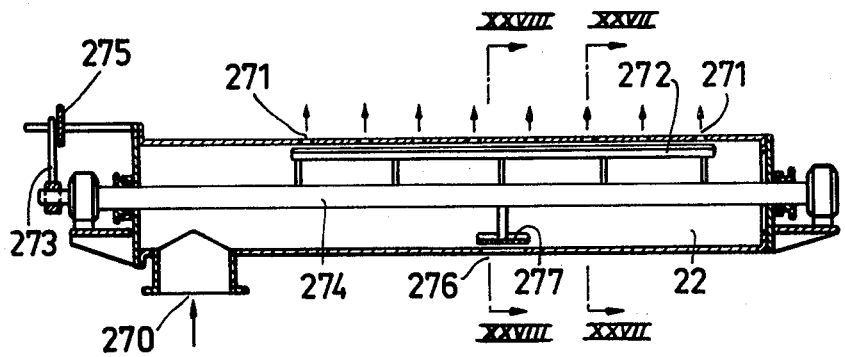
Figures 26, 27, 28:
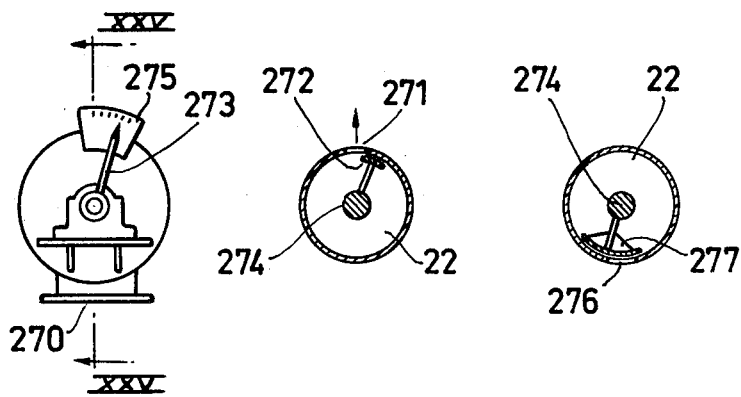
Figure 29:
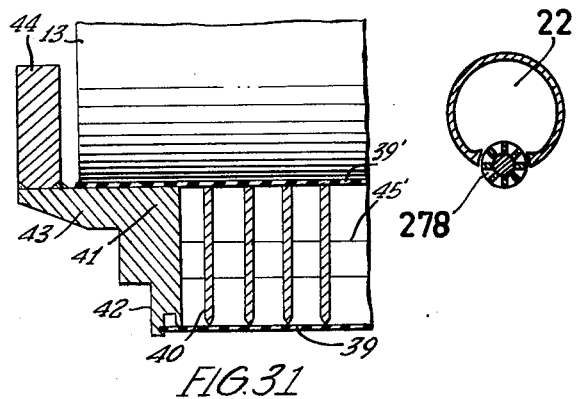

FIG. 6 shows a longitudinal view, i.e. the arrangement according to FIG. 2 seen from the right-hand side, FIG. 7 shows a section along the line VII—VII in FIG. 2, but shows only the details at the one front wall (as the arrangement is symmetrical, the details on the other front wall are in inverse relationship to FIG. 7), FIG. 8 shows a section along the line VIII—VIII in FIG. 7, FIG. 9 shows the axial screen casing joint of the outer drum in principle, FIG. 10 is a detail in the outer drum in connection with the mounting of the screen casing, FIG. 11 shows a section along the line XI—XI in FIG. 9, FIG. 12 shows the means for fastening the screen casing to the ends of the outer drum in principle, FIG. 13 shows a section along the line XIII—XIII in FIG. 12, FIG. 14 shows a detail of the mounting of the screen casing for the inner drum in principle, FIG. 15 shows a cross-section of the apparatus in a modified embodiment (the figure is drawn schematically and for reasons of better clearance highly exaggerated. The figure does not show certain of the components which are similar to those shown in FIG. 1), FIG. 16 shows a section at the front wall of the outer drum in the modification according to FIG. 15, FIG. 17 shows a section along the line XVII—XVII in FIG. 16, FIGS. 18 and 19 show in a schematic manner modifications of the sealing device between the drums and the trough, FIGS. 20 and 21 show cross-sections of two alternative modifications of the inner drum, FIG. 22 shows in a schematic manner an end view of the inner drum according to the modification shown in FIG. 21, FIG. 23 shows a cross-section of an assembled unit comprising three screen drums, FIG. 24 is an end view of an assembled unit also comprising three screen drums whereof one is disposed above the others, FIG. 25 shows a cross-section of a modification of the feeding device along the line XXV—XXV in FIG. 26, FIG. 26 shows an end view of the inlet device, FIG. 27 shows a cross-section along the line XXVII—XXVII in FIG. 25, FIG. 28 shows a cross-section along the line XXVIII—XXVIII in FIG. 25, FIG. 29 shows a cross-section of a modification of the feeding device, FIG. 30 shows in section another modification of the outer drum, FIG. 31 is a fragmentary sectional view showing a further modification of the outer drum incorporating an outer perforated casing.

Referring to the drawings, 10 designates an inner screen drum, 11 an outer screen drum and 12 a trough. 13 designates a press roll and 14 a supporting roller. 15, 16 and 17 designate doctors and 18 a "pulp table." 19 designates a breaker, 20 a screw conveyor and 21 a trough common to said breaker and screw conveyor. 22 is an inlet pipe, 23 and 24 designate pipes or means adapted for cleaning the screen casings of the drums, and 25 is a pipe or a means used for dilution before operation or for the addition of "washing liquid."

The inner screen drum 10 (preferably with a diameter of the magnitude 1000–3000 mm.) is mounted in the bearings 26 and 27 (FIG. 4) and, in principle, constructed of the following details. The drum is provided on the outer surface with a screen casing (having preferably a thickness of the magnitude 0.5–1 mm. for fibrous pulp suspensions) designated by 28. Said casing is supported on a perforated casing 29 having countersunk holes.

The screen casing 28 is preferably secured by a screw joint substantially in the following manner. The one end of the axial joint of the screen casing is secured by welding, while the circumferential joint at the front walls, and also the outer end of the screen casing at the axial joint are secured by a suitable number of screw joints, in principle according to FIG. 14, where 56 is a partially threaded round bar, 57 a washer and 58 a nut. In the perforated casing 29, there is provided an "indent," in principle according to FIG. 10 (which will be later described in greater detail in connection with the description of the outer drum). The perforated casing 29 is maintained in round state by a plurality of frame rings 30. At each end wall there is provided a sealing flange 31 with the screen casing 28 located therebetween (the width of the screen casing 28 is considered the "working width"). The extension of the flanges in a radial direction outside the screen casing 28 is normally of the magnitude of 20–60 mm. (the function will be described later on). The frame rings 30 are supported on a suitable number of axially extending support plates 32 which may, if desired, be perforated or provided with suitable recesses. The said support plates 32 rest on the inner casing 33 of the drum, and the inner casing is braced by a suitable number of ring-shaped plates 34. Said plates 34 are welded on a through shaft 35. For sealing against the end walls of the trough 12, the rotary drum is provided with rings 36 projecting from each end wall, which rings are preferably chamfered (see FIG. 7). Rotation of the drum is effected by a drive means (not shown) via the driving pin 37 (FIG. 4). The number of revolutions of the drum is preferably chosen to be of the magnitude 4–10 r.p.m.

The outer screen drum 11 (preferably with an inside diameter of a magnitude exceeding the outer diameter of the inner drum by 400–1000 mm.) is disposed about the inner drum 10 and is not supported on bearings. The position of the drums in relation to one another is preferably chosen such, that the angle α (see FIG. 1) is of the magnitude 20–40°. The outer drum 11 is guided in axial direction by a guide roller 38 (FIG. 2) adjustably mounted on each end wall of the trough 12. The outer screen drum 11 is in principle constructed as follows. 39 designates a screen casing which is supported by a spirally wound flat bar 40 (FIG. 4). The end walls are provided with rings 41 constructed to serve as the axial guides for the screen casing 39. At the same time, the radial surfaces 42 have such axial location that they "run inside" the sealing flanges 31 (FIG. 7). The measurement A should be somewhat greater than measurement B (see FIG. 7) in order to prevent the screen casings 28 and 39 when idling from going directly against one another. In order to effect sealing of the outer drum 11 against the end walls of the trough 12, each of the rings 41 is provided with a projecting portion 43 which preferably is chamfered, i.e. in principle like the rings 36 of the inner drum. For guiding the drum in an axial direction, each of the rings 41 is provided with a radial flange 44 which engage the aforementioned guide rollers 38. For achieving the desired space between the turns of the spirally wound flat bar 40, distance sleeves 45 are provided between the said turns. A suitable number of tie rods 46 extend through the rings 41, the spirally wound flat bar 40 and the spacer sleeves 45 and, thus, secure the parts of the drum together with the help of screw joints at the ends.

The screen casing 39 is preferably mounted substantially by screw joints after the method as follows. The one end 47 of the axial joint of the screen plate is provided with recesses for the flat bar coil 40 and bent, whereafter it is welded to the other end. (The location of the welded joint is marked by 48—see FIG. 9.) Prior to the welding operation, an "indent" 49 extending over the entire width, i.e. the width of the screen plate, was made (see FIG. 10).

The screen plate 39 is secured to the drum all around the ends of the latter by means of threaded round bars 50 secured on the outside of the screen casing 39. The round bars extend through the "beams" 51 located between the tie rods 46 and the spacer sleeves 45. The screen casing 39 can, thus be secured in place, by nuts 52 be drawn against the support (see FIG. 12). The beams 51 are preferably placed alternately between, for example, the second and the third turn from the ends of the flat bar 40, thus preventing the formation of an obstacle for the flow of liquid which is uninterrupted in circumferential direction. The other end of the screen 39 at the axial joint 53 is, as appears from FIG. 9, fastened principally in the same manner as described above. The beams 54 extending between the tie rods 46 are curved in order to permit the use of shorter bars 55 which facilitates the attachment of the screen casing 39. Such attaching means are preferably arranged between each third or fourth turn or ring (in the case of thinner screen casings a closer spacing may be necessary). It is, however, to be observed that there is no welding other than of the aforesaid end of the plate at the axial joint. The other end is located on the outside and can, thus, be displaced somewhat. In view of the "indent" 49 the fact that the end 53 is ground to be somewhat acute, there is only a very insignificant deviation from a circle at the axial joint.

The trough 12 comprises, as appears from FIG. 4, substantially two end walls 59 and 60 and a casing sheet 61. In order to maintain the suspension at an accurate desired level, one or both of the end walls are provided with a vertically adjustable "spillway" 62 (FIG. 5). The outlet for the "overflow" is designated by 63. In one or both of the end walls, there are further provided apertures 64 for the filtrate from the inner drum, the arrangement being such, that the filtrate is conducted together with the filtrate from the outer drum. (This is not a necessary arrangement for the operation, its only object is to have only one connection for the filtrate discharge.) According to the drawings, communication between the filtrate of the inner drum and the filtrate collecting trough of the outer drum occurs via the pipes or channels 65. The outlet fitting for the filtrate is designated by 66. 67 designates detachable shields to facilitate mounting and demounting of the drums, and 68 is a splash guard detachably mounted on each end wall. 69 (FIG. 1) designates cleaning and inspection openings, and 70 (FIG. 6) are shields for the breaker 19 and screw conveyor 20. The trough 21 which is common to the two last mentioned components 19 and 20 continues on the outside of the end wall 60 only for the conveying screw 20 as shown at 71 in FIG. 6. The outlet for the pulp is directed downwards and designated by 72. In the end walls 59 and 60 there are apertures 73 at the guide rollers 38 (FIG. 7). Apertures in the end walls 59 and 60 are also provided for facilitating mounting and demounting of the support roller 14. The last mentioned apertures are covered by plates 74 (FIGS. 3 and 6) provided with packing boxes or labyrinth sealings.

The press roll 13 is urged against the outer drum preferably by a pneumatic or hydraulic means. On the drawings, the pressure cylinders or like elements are designated by 75. (Stop screws, not shown, limit movement of the press roll to avoid excess pressure on the outer drum when the press roll runs idle.) The press roll 13 is supported on two levers 76 (FIG. 2) which in turn are supported on brackets 77. In order to prevent deformation of the outer drum, the contact surface of the roll 13 may be made of a material which is more yieldable than that of the drum.

The supporting roller 14 (FIG. 1) is mounted in bearings 78 and 79 (FIG. 6). The contact surface of this roller may also be made of a more yieldable material than that of the drum. The supporting roller 14 is preferably placed to the left side of the vertical central line of the outer drum (see FIG. 1), i.e. on the same side of the outer drum on which the nip is located. The reason for this is that the weight of the outer drum and also the weight of the suspension produces a pressing force in the "nip" 80 without utilizing the press roll 13 for this purpose. (The importance of this will be explained later.) The closer the roller 14 is placed to the nip 80 the greater is the pressing force obtained in the same without using the press roll 13.

The doctor 15 (FIG. 1) is at its end provided with pins 81 mounted in holders 82 (FIG. 2) which permits swinging movements of the doctor. By means of a counterweight (or spring) 83 the edge 84 of the doctor is pressed against the screen casing 39 of the outer drum. As it is desirable, in order to avoid wear, to have play between the doctor edge 84 and the screen casing 39, the doctor is at its ends provided with rolls 85 which preferably run against the surfaces 86 (see FIG. 7). The edge of the doctor is preferably made of isolite, ferobestos or like material and is preferably adjustable and exchangeable. The doctor, thus, automatically follows the movements of the outer drum, with a constant play between the doctor edge 84 and the screen casing 39.

The doctor 16 is constructed in substantially the same manner as doctor 15. In order to prevent splash from the breaker 19 entering the suspension 87, the doctor 16 is at its rearmost portion provided with a labyrinth 88. The center of oscillation of the doctor 16 is designated by 89 and the counterweights are designated by 90.

The breaker 19 is mounted in bearings 91 and 92 (FIG. 6). Its drive pin is designated by 93 (the drive means is not shown). The breaker comprises a shaft with breaking members 94, the latter preferably being pins or flat members arranged in spirally wound rows.

The screw conveyor 20 which is of entirely conventional type is mounted in the bearings 95 and 96 (FIG. 6). The screw conveyor is preferably driven via a belt transmission 97 from the breaker 19 which makes a separate drive means unnecessary.

The doctor 16 and the trough 21 are preferably designed such, that the space 98 between these two details on the one side and the screen casing 39 on the other side increases progressively from the doctor edge 99 downwards to the portion of the trough which is designated by 100 (see FIG. 1). The reason for this is, that fibers or particles are prevented from "building up" on the respective details 16 and 21 in the course of time to such an extent as to cause shutdowns. Thanks to the gradually increasing space 98 the risk of such build up is eliminated.

For the same reason, even the gap 101 between the doctor 17 and the pulp table 18 on the one side and the inner drum 10 on the other side is made gradually increasing in the direction of motion of the drum.

The inlet pipe 22 preferably extends through the end walls 59 and 60 made throughgoing and is rotable. It is provided over the working width with a row of holes or a slot 102 for obtaining a suitable pressure drop which over the working width produces a uniform distribution of the entering suspension.

The pipe or arrangement 25 comprises a hollow and preferably streamlined hollow body with the edge 103 facing the direction of rotation of the drums. On the opposite edge and across the entire working width there is provided a row of holes or a series of nozzles 104. Through the holes or nozzles liquid ("washing liquid") may be added to the suspension via the inlet 105 (FIG. 2). If desired the holes or nozzles may be replaced by a slot. Irrespective of the system utilized, the outlet means 104 must be constructed such, that it closes automatically as soon as the pressure becomes greater on the outside than on the inside of the body 25. The body 25 should be mounted in such a manner such that it may be adjusted substantially in the direction of motion of the drums, for example, by mounting in slots in the end walls 59 and 60. Said slots may be covered by cover plates.

The means for sealing of the inner drum 10 against the trough 12 comprises preferably an O-ring 105 engaging at each end wall 59 and 60. (Schematically shown in FIG. 18. See also FIG. 4.) The O-rings are mounted on the one end by clamps or like elements 106. On the other end the O-rings are guided by sleeves 107, and tension springs 108 with adjustable tractive force are provided. The sealing of the inner drum shaft 35 may be made in a conventional manner by packing boxes in the shields 67 or alternatively by labyrinth sealings. The drawings show a simple sealing by detachable rings 109. In the latter case, openings 110 are provided below said rings. (The openings may also serve as inspection holes.)

The sealing of the outer drum 11 against the trough 12 may be made according to at least two different alternatives. (Which alternative is to be preferred depends on the medium to be dewatered.)

Figure 3:
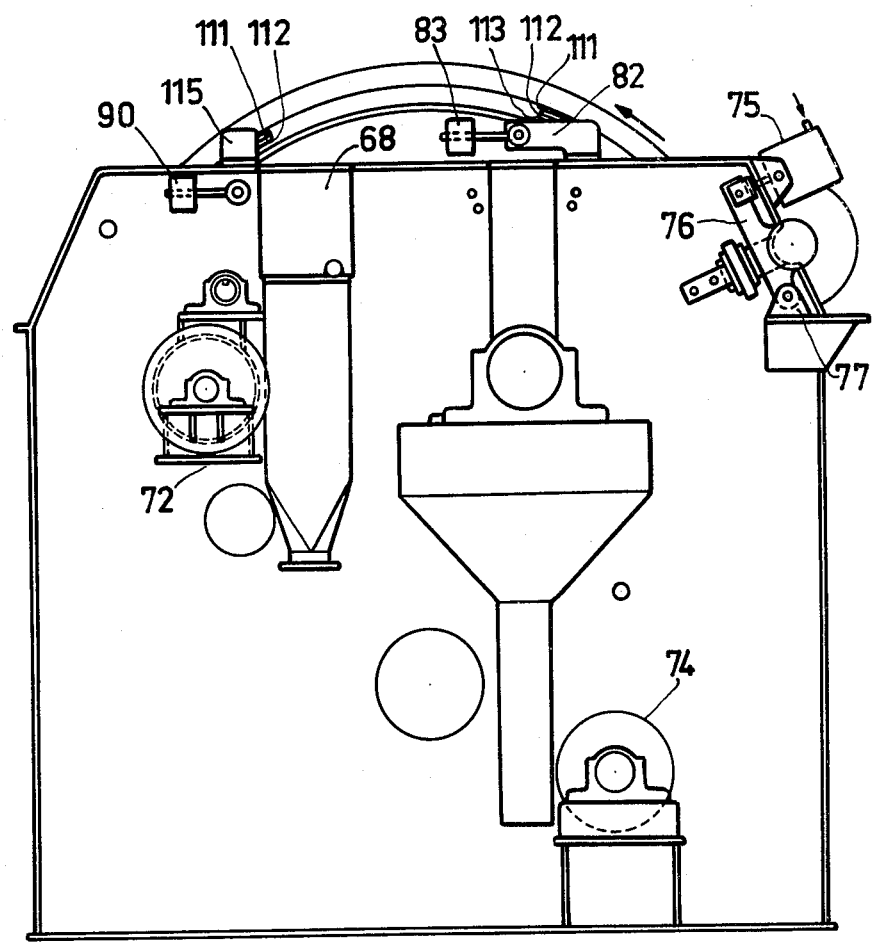

The one alternative appears substantially in principle from FIG. 4 and FIG. 7. As in the case of the inner drum 10, even the outer drum may be provided with an O-ring 111 at each end wall. As there is during the idle run, i.e. prior to the start, no force which holds the sealing rings 111 against the rings 43 of the outer drum 11 and the trough end walls above the horizontal central line of the outer drum 11, in this alternative a hose 112 is provided which may be subjected to inside overpressure. Said hose communicates with a pressure source via a connection 113 (FIG. 3). The hose 112 (FIG. 7) presses the O-ring 111 against the sealing surfaces of the end walls 59 and 60 and the flanges 43. As a support for the hose 112, a ring 114 is provided on each trough end wall 59 and 60. The O-rings 111 and the hose 112 are preferably retained by clamps or similar elements mounted on the holders 82 and 115 (FIG. 3).

The second alternative appears in a schematic manner in FIG. 18 wherein 116 designates a hose (alike at each end wall) which at the ends is provided with plugs 117 and 118. Plug 118 is provided with a connection 119 for pressure liquid or pressure air. The plugs are retained by hose clamps 120 and the hose is secured at one end by a clamp or like element 121 and guided at its other end in a sleeve 122. A compression spring 123 with adjustable compressive force engages the end guided by the sleeve 122. In this second alternative, there are thus neither hoses 112 nor rings 114. (In this modification the clamps 121 may be eliminated and compression springs provided at both ends of the hose 116.) The springs 108, 123 and 144 may, of course, be replaced by pneumatically or hydraulically operated means for producing the desired forces.

The adjustable guide rolls 38 at each end wall 59 and 60 (FIG. 7) are preferably constructed with detachable treads 128 of a material more guideable than that in the rings 44 (for example isolite, ferobestos, ebonite or like material). The said detachable treads 128 are preferably constructed such, that they are rapidly exchangeable. By making use of a material as employed in liquid-lubricated slide bearings, the treads 128 of the guide rolls 38 are given a long life even if the outer drum during operation continuously changes its position in a radial direction.

At higher rotary speed and/or in the case of a great angle α (see FIG. 1), it may be advantageous in certain cases to "blow" away by compressed air (or another pressure medium) the liquid pressed out of the pulp layer at the nip 80, i.e. such liquid which either is carried along on the outside of the screen casing 39 of the outer drum or which is found in the holes of the screen casing. The object of this is to prevent such liquid from being absorbed by the pulp layer to the nip 80 and, thus, to increase the moisture content.

An arrangement for the aforesaid object comprises a conduit 250 extending over the entire working width and with a slot or row of holes which continuously produces an air stream at the nip 80 directed opposite to the direction of rotation of the drum 11.

The above described apparatus operates as follows.

The inner drum 10 is rotated by its drive means (not shown). Due to the location of the roller 14, the outer drum 11 engages the inner drum 10 at the nip 80 and is, therefore, also rotated. After the breaker 19 and screw conveyor 20 are started, suspension 87 is pumped in via the inlet 124 and via the holes or slot 102 in the pipe 22. When the suspension has reached the upper edge 125 of the spillways, the suspension flows over the same whereby a constant level 126 is obtained. (This level shall be located at a safe distance below the nip 80, i.e. a distance such that pressed and thus dewatered pulp is not re-watered by the suspension). The pulp layers are laid on the screen casings 28 and 39 by the hydrostatic overpressure, and the pulp layers are combined at the nip 80 where, at the start, a certain lighter pressing is carried out without using the press roll. (How this pressing force is produced, was described above.)

(Note that if the roller 14 should be placed such that pressure is not automatically provided in the nip, it would be necessary to engage the press roll 13 from the beginning at exactly the right moment and with a gradually increasing pressure in order to prevent crushing of the pulp layer at the start. This would require skilled manual work. If under the same condition the press roll 13 was engaged too late, a large volume of "wet pulp" would cause trouble for several reasons. There would be, for example, the risk that the pulp web would not be guided onto the pulp table 18. The screw conveyor 20, and consequently the diameter of the outer drum 11 would have to be made larger.)

After the two pulp layers are pressed together in the nip 20 to form one pulp layer, said layer is removed from the outer drum 11 by the doctor 15. When the pulp layer has fallen down on the inner drum 10, it is removed therefrom by the doctor 17. The pulp layer is directed via the pulp table 18 to the breaker 19 where the layer is broken into fragments so that the screw conveyor 20 can feed out the pulp via outlet 72.

When a uniform web is obtained, the press roll 13 is engaged for effecting high-grade dewatering. As already mentioned, the doctor 16 has as its object to prevent splash from the breaker 19 from entering the suspension 87. The doctor 16 also provides a substitute for the doctor 15 if the latter for one reason or another should fail.

The "washing pipe" or arrangement 25, when utilized operates as follows. When the pulp layers are substantially laid on the two drums, the arrangement 25 serves to add liquid which has higher cleaning properties than the liquid in the suspension 87 (for example fresh water or back water from a machine located at a later stage in the process). The "tubular spray" 25 should be placed such that the "cleaner" liquid penetrates into the pulp layers for only to a part of their thickness. In the nip 80, the main part of the liquid which is "outside" the "clean liquid zone" of the pulp layers is pressed out and the remaining moisture found in the outgoing pulp web should, thus, substantially (or at least partially) consist of the cleaner "washing liquid." The arrangement 25 may also be utilized for diluting a thickened suspension prior to the start of the apparatus.

The filtrate from the inner drum 10 which is designated by 127 is conducted via the channels 65 (FIG. 2) to the filtrate outlet 66. The filtrate from the outer drum 11 flows "directly" to the outlet 66. The common outlet for the filtrate from the two drums is, thus, designated by 66. When the pulp layers are compressed before entering the nip 80, the end portions of the layers are prevented by the sealing flanges 31 from being pressed axially outwards.

For cleaning the screen casings 28 and 39, usually liquid is sprayed by the pipes 23 and 24 under relatively high pressure against the screen casings. In certain processes (for example in washing plants of cellulose factories), it is not possible to use liquid because this would give rise to foaming problems. In such cases, for example, steam may be used.

The invention is not restricted to the embodiment above shown and described, but a plurality of modifications are possible. The outer drum, for example, need not be provided with a spirally wound flat bar, but every turn may be designed as a separate ring. When every turn is designed as a separate ring, the rings are preferably laid somewhat inclined in relation to the axial central line of the drum (so that it resembles a spiral winding), i.e. the rings are laid inclined to such an extent that non-uniform wear of the rolls 13 and 14 cannot occur. Even in the embodiment including rings, the drum may be provided with tie rods and spacer sleeves as described above, but another alternative may in such a case be more advantageous, viz.: The tie rods with spacer sleeves may be replaced by bars 280 secured by welding to the end rings 41 (the construction appears in FIG. 30).

A modification having the object of reducing the wear of the rolls 13 and 14 (and also of reducing the manufacturing costs of the outer drum 11) is shown in FIG. 30. This modification differs from previously described embodiments in that a certain number of symmetrically disposed rings 283 are of a diameter exceeding that of the remaining rings 284 and the rings 283 are of T-section. In this case the rolls 13 and 14 need not abut against the relatively thin rings 284 which in this embodiment, moreover, may be made considerably thinner than normal. (The reason for this is that the thickness is substantially determined by the surface pressure between the rolls and the drum.) The portions 285 of the end rings 41 against which the rolls 13 and 14 abut, may also preferably be of the same diameter as the surfaces 286. In this embodiment there is, thus, no reason for placing some rings in an inclined position.

As another modification the outer drum may be surrounded with a perforated outer casing 39'. The flat bar spiral 40 or the rings 283 and 284 would, in such a case, be placed between the screen casing 39 and the perforated outer casing 39', and the elements would preferably be welded both to the outer perforated casing 39' and to the internal screen casing 39. Tie rods or bars would not be required, which elements may preferably be replaced by spacer members 45' disposed between the turns or rings. The object of this modification with an outside perforated casing is that it almost entirely eliminates wear of the rolls 13 and 14.

(NOTE. When, however, the outer drum 11 is provided with a perforated supporting casing like the inner drum 10 this may in certain cases constitute a serious disadvantage, because this perforated casing, for reasons of strength, must be made relatively thick-walled. In view of the location of the nip 80, the liquid trapped in the holes in the relatively thick perforated casing would be absorbed by the pulp following the nip and partly ruin the dry content obtained. It is, however, possible to place the nip on the same level with the horizontal central line of the outer drum 11, but in such a case a lower hydrostatic overpressure and, as a result thereof, reduced capacity is obtained.)

It is, therefore, from a functional point of view of essential importance to construct the outer drum with carrying elements which have no axially extending stiffeners or bars to impede the outflow of the liquid which as been pressed out.

The screen casings 28 and 39 may, of course, be secured entirely by welding. (The method of using screw joints results, however, in several advantages.) The risk of "bosses" is eliminated which may arise during the manufacture or during the course of time by expansion of the screen casings, and, moreover, the screen plates expand more rapidly than elements located behind them when steam is used in the pipes 23 and 24, which also may cause "bosses." In the event of the formation of "bosses," the screen plates will thereafter have a short life. Another advantage is that the screen casings are easy to exchange for other casings with a different size of holes if suspensions with other properties are to be treated.

On the drawing, the tubular spray 24 is disposed outside of the outer drum 11. It is, however, in certain cases advantageous to place the spray inside the drum. In that case, the spray is preferably arranged approximately between the breaker 19 and the doctor 16. A suitable location is designated at 24' in FIG. 1.

In another modification, the screw conveyor 20 may be replaced by a pneumatic evacuation device which would have the advantage of less space requirement.

The guide rollers 38 located at the nip may, of course, be replaced by stationary, i.e. non-rotary but axially adjustable "blocks" or like elements. The blocks may be provided with contact surfaces of slide bearing material. The number and location of the guide elements is not limited to two elements placed at the nip, but, for example, four guide elements may be preferable in certain cases (depending on the size of the outer drum and the medium to be de-watered). When four guide elements are used and none are placed at the nip, the guide elements may run on or abut against the surfaces of the outer drum which are designated by 42 (see FIG. 7). In such a case, the flanges 44 can be abolished.

(When "blocks" or "guide bars" are used, a device must be provided for flushing away fibers or other wearing particles from the surfaces of the outer drum against which the guide elements abut. There must also be provided an alarm device which indicates when the axial position of the guide elements is to be adjusted or when such elements must be exchanged. The alarm device is, of course, also desirable when guide rollers are employed).

The trough 12 must be modified for such media which may foam or give off toxic gases, i.e. the trough must in such a case be completely closed. For necessary inspection the trough is provided with transparent inspection windows with wiper driers on their inner surface.

The inner drum 10 may, of course, be constructed in principle in the same manner as the outer drum 11, i.e. the perforated casing 29 is replaced by a spirally wound flat bar or frame rings with spacers and tie rods.

As the pressing time is of great importance for the outgoing dry content, it is desirable to extend the pressing period—without reducing the rotary speed of the drums. (Reduction of the rotary speed results in a decrease of capacity.) The only way available is to construct the outer drum 11 (possibly also the inner drum 10) so as to be yieldable, whereby the drums will not have a line contact but will follow in the nip 80 the outlines of one another for as long a distance as possible. FIG. 15 shows the principle in a schematic manner (the drawing is, however, exaggerated for reasons of easier illustration of the principle). The outer drum 11 is made of a material with a modulus of elasticity below that of normal steel and with high fatigue strength (for example reinforced plastics or rubber). The design of such a yieldable drum is shown in principle in FIG. 16. In FIG. 16 end rings are designated by 131, exchangeable wear rings by 132, a flat bar spiral or frame rings by 133, tie rods by 134 and spacer sleeves by 135. In order to make the contact surfaces between the screen casing 39 and the spiral or rings 133 as small as possible so that a free area in the screen casing is obtained which is as large as possible, the flat bar spiral or rings 133 are provided with recesses 136 extending continuously around the inner periphery distance. (The measure C is preferably greater than the distance D, the latter being greater than the distance E.) The recess or "furrow" 136 communicates with preferably axially extending holes 137. (Instead of the holes 137 U-shaped recesses may be utilized, as shown in principle in FIG. 8, which recesses in such a case for reasons of strength are preferably staggered.)

The press roll 13 may be modified in such a manner, that is provided with a relatively thick casing of highly elastic or yieldable material. A possible construction of such a roll is shown in FIG. 15. About a supporting tubular steel shaft 138 is wound a hose 139 which via a centrally located hole in one shaft journal communicates with a pressure source (pneumatic or hydraulic). In addition to the hose spiral 139 the roll is provided with a "stocking" 140 of wear-resistant material, for example reinforced rubber. When the elastic casing is sufficiently thick, the roll need not be movably mounted on levers. There is consequently no need of pressure cylinders or like elements, but the roll may be mounted in standard bearings which are fixed or adjustably secured on the trough. (Another advantage with such a yieldable roll is, that the outer drum 11 from a strength point of view, may be of smaller dimensions, because the bending moment produced at the nip 80 is partially taken up by the press roll.) Even the surface pressure between the roll and the drum is considerably reduced. Substantially the same advantages which are obtained with one highly yieldable press roll (a longer nip and a smaller bending moment) can be obtained with two non-elastic or non-yieldable press rolls located close to one another, i.e. the pressure is applied by two adjacent rolls 13.

According to another modification the roll 14 may be placed sufficiently close to the nip 80 that the entire press roll 13 may be abolished. By designing the roll 14 such that its position in relation to the nip 80 is adjustable, the magnitude of the pressing force can be varied by changing the position of the roll 14. (When the outer drum is made of yieldable material, even the roll 14 is, from a wear point of view preferably provided with a casing 141 of yieldable material as shown in FIG. 15.)

In order to obtain a correct and constant level 126 of the suspension 87, the apparatus is provided with "spillway" 125 (FIG. 5). It is, of course, possible to replace this spillway with an instrument which automatically changes the rotary speed of the drums so that a constant and desired level is obtained.

In order to obtain a still better distribution of the incoming suspension over the working width, the inlet device 22 may be provided with a second pipe (not shown) which is also provided with a slot or row of holes extending over the working width. In such a case, the slots or row of holes in the two pipes are preferably directed at an angle of about 180 degrees in relation to one another.

Another modification of the inlet device 22 is shown in FIGS. 25, 26, 27 and 28. The device has as its object to provide a uniform distribution of the suspension even if there is a widely varying incoming quantity at certain times. The device has as another object to allow the cleaning of clogged holes without interrupting operation of the apparatus, and in the event of unexpected stops of longer duration to remove all suspension from the apparatus. In the aforesaid figures, 270 is the inlet for the suspension and 271 a series of holes (or a slot) through which the suspension may flow. The holes are preferably of oval shape. 272 is a shield adapted to be adjusted in a peripheral direction, which shield has as its function to reduce the effective area of the outlet holes. By means of the combined crank and pointer 273 the shaft 274 with the shield 272 mounted thereon is turned. From the scale 275 the position of the shield can be read. It is thus possible during operation to adjust the shield 272 to provide the desired pressure drop in order to obtain the desired uniform distribution of the suspension. (It is, of course, also possible, instead of changing the effective area to the same degree of all holes, to construct the shield such, that it closes entirely a desired number of holes and leaves the other holes fully open. The result from a functional point of view will be substantially the same.)

When on occasion impurities in the suspension may clog one or several outlet holes 271, the crank 273 may be turned a complete one turn whereby an effective cleaning of the outlet holes is effected. In order to allow effective removal of all suspension prior to a long stoppage, the device is provided in the bottom with an opening 276 which during operation is covered by a guard 277. The guard 277 is also secured to the shaft 274. By changing the position of the crank 273, the guard exposes the bottom opening 276.

(As described above the effective area of the holes 271 and the opening 276 is changed by peripherally moving shields. It is, of course, possible to use the same basic idea and to obtain the same effect by an axial movement of the necessary number of shields.)

A further possible modification of the inlet device 22 for use under difficult conditions (for example in the case of a very thick suspension) is an arrangement where a sluice discharge extends over the entire working width (FIG. 29). An arrangement of this type must be provided with a drive means. By varying the rotary speed of the rotary member 278 the desired pressure drop can be effected in this embodiment.

The sealing of the outer drum against the trough may also be modified in several ways. The sealing strip 111 or 116, for example, need not have a round cross section. Furthermore, the "inflatable" hose 112 need not be as long as the sealing strip 111. It is, in principle, sufficient when the ends of strip 111 (i.e. substantially the portions over the central line of the outer drum) are pressed against the sealing surfaces in question. Another modification is schematically shown in FIG. 19, where the sealing strip 142 is in principle provided with the necessary number of radially outwardly directed elements 143. The elements 143 are connected to tension springs 144. The strip 142 may, thus, be provided with a certain number of outwardly directed tension springs 144 inclusive of fastening elements 143 over the entire length of the sealing ring or alternatively only over the portions located above the centre of the outer drum 11. The outer end 145 of the tension springs 144 is preferably mounted slidably on a ring (or parts of a ring) 146 substantially concentric with the drum 11.

A further modification with the object of increasing the capacity is the design of the inner drum 10 in such a manner, that the same may be subjected to a vacuum, i.e. the inside vacuum serves to increase the pressure difference between the inside and outside of the filter medium.

In FIG. 20 a drum with axially extending cells 260 is shown, whereof each cell is provided with a channel 261 directed rearwards in the direction of rotary movement.

FIGS. 21 and 22 show a different modification for providing a vacuum. In this case there are also provided axial cells 262 which in certain positions, via a stationary "suction box" or valve 263 and an outlet pipe 264, communicate with a filtrate container 265. In order to obtain a "seal" the outlet pipe 264 opens below the filtrate level 266. The filtrate container may be placed in the vertical direction on any level, for example 5 metres below the suction box. (At a level difference of 5 m. between the suction box and the filtrate level 266, a vacuum of about 5 m. water-column is obtained.) In this alternative, the outlet pipe 264 replaces, entirely or partially the pipes or channels 65 according to the design of the suction box.

A suitable modification for low input concentrations (of the order of 0.5–1.5% of fibrous pulp suspensions) is to arrange in advance of the apparatus according to the invention and in combination with the same a further screen drum 147 together with a trough 148, i.e. certain parts of the trough 148 will be in common with the trough 12 (see FIG. 23). The screen drum 147 is provided with a perforated casing 149 which on its inside is stiffened in one way or another and surrounded by a filter cloth. One end wall of the drum is open, i.e. it serves as an outlet for the filtrate. Between the rotary drum 147 and the stationary trough 148 there is provided a sealing device which in principle is like that of the drum 10. The pulp thickened in the trough 148 is removed by two or more follower ledges 150. The filtrate level 151 is manually or automatically adjustable at the desired height by changing the vertical position of the damming means 152. The filtrate outlet is designated by 153. By changing the position of the damming means 152 the concentration of the outgoing suspension is controlled. The outgoing suspension flows via the adjustable spillway 154 into an outlet box 155. In the arrangement according to FIG. 23 a portion of the casing 61 constitutes the one long wall of the outlet box 155. The outlet box 155 communicates on one or both ends with the inlet pipe 22 via pipes or channels 156. In order to obtain suitable concentration of the suspension 87 and in order to eliminate the spillways 62 (or in any case to prevent a larger amount of suspension from flowing over the spillway, or to prevent the level 126 from becoming too high), i.e. in order to obtain a constant and desired level 126, at least four different alternatives are possible all of which when they are arranged to operate automatically—receive impulses via instruments from the said level 126, viz.:

(1) Automatic control of the vertical position of spillway or damming means 152

(2) Automatic control of the vertical position of spillway 154

(3) Automatic control of the rotary speed of screen drum 147

(4) Automatic control of the rotary speed of drums 10 and 11.

A combination of the aforesaid four alternatives is, of course, also possible.

Instead of an assembled unit with the drums at about the same height, as shown in FIG. 23, the screen drum 147 may, of course, be placed above the drums 10 and 11, as shown in FIG. 24 (in such a case the trough must be modified such that the drums 10 and 11 can be mounted from one side, i.e. one end wall must comprise a demountable portion of a size allowing the mounting of the outer drum 11).

The advantage of the arrangement according to FIGS. 23 and 24 compared with separate units is, that it requires less space and certain details can be made in common, with lower costs as a result. Furthermore, a normally necessary pump is eliminated as well as the power requirements of the pump and piping to and from the pump. The inlets for the suspension to the afore-described assembled units are designated by 157.

It will be obvious to those skilled in the art that various changes may be made in the invention without departing from the spirit and scope thereof and therefore the invention is not limited by that which is shown in the drawing and described in the specification, but only as indicated in the appended claims.

What I claim is:

1. An apparatus for high-degree dewatering of hydrous substances such as fiber pulp suspensions, said apparatus comprising an inner rotary screen drum, an outer rotary screen drum, said inner drum being disposed eccentrically within said outer drum, said drums having substantially parallel axes and defining between them a nip, means for urging said outer drum toward said inner drum along said nip, means for supplying a hydrous substance into said outer drum, rotation of said drums serving to feed said substance between said drums at said nip to compress said substance and remove water therefrom, means for removing the dewatered substance and the water removed therefrom, said outer drum comprising a thin screen casing and stiffening means on the outer surface of said casing, at least certain portions of said stiffening means adjacent the surface of said casing extending substantially circumferentially thereof, radially extending sealing flange means on each end of said inner drum, and axially spaced sealing surfaces on each end of said outer drum, said flange means overlapping said sealing surfaces to provide a seal between said drums.

2. An apparatus as defined in claim 1, in which said stiffening means comprises spaced ring members, at least one of said ring members being of T section and having an outer diameter greater than the outer diameters of the other ring members.

3. An apparatus as defined in claim 1, in which the means for urging said outer drum toward said inner drum comprises a supporting roll engaging and supporting said outer drum along a line on the same side of the center of gravity of said outer drum as said nip, whereby gravity will cause said outer drum to rock about said roll toward said inner drum at said nip.

4. An apparatus as defined in claim 3, in which the means for urging said outer drum toward said inner drum further includes a press roll disposed outwardly of said outer drum opposite said nip and engaging said outer drum to assist in urging said outer drum toward said inner drum along said nip.

5. An apparatus as defined in claim 1, and including means for directing a stream of compressed gaseous fluid against the outer surface of said outer drum at the nip to remove liquid from the screen casing of said outer drum.

6. An apparatus as defined in claim 5, in which said means for directing said fluid comprises an elongated pipe having spaced apertures directed laterally toward the outer surface of said outer drum for dispensing of the gaseous fluid.

7. An apparatus as defined in claim 1, in which said stiffening means comprises annular members each having a circumferential groove in the inner surface adjacent the screen casing of said outer drum, said grooves communicating with axially disposed apertures in said annular members.

8. An apparatus as defined in claim 1, in which said inner drum is provided with a plurality of circumferentially spaced axially extending cells on the inner surface thereof, said cells being defined by imperforate spaced walls, said walls providing channels extending rearwardly with respect to the direction of rotation of said inner drum, said channels providing communication between said cells and the central portion of said inner drum.

9. An apparatus as defined in claim 1, in which said outer drum is provided with an outer perforated casing and spaced outwardly from the screen casing supported by said stiffening means.

10. An apparatus as defined in claim 1 and including a stationary trough disposed outwardly of said drums, said trough having an outer wall disposed around a lower portion of said drums and opposed end walls spaced outwardly of the ends of said drums, and sealing means disposed between the ends of said outer drum and the end walls of said trough, said sealing means comprising annular sealing members, and inflatable hollow elements engaging at least a portion of the length of said sealing members to urge the same into sealing engagement with the ends of said outer drum and the end walls of said trough.

11. An apparatus as defined in claim 1 and including a stationary trough disposed outwardly of said drums, said trough having an outer wall disposed around a lower portion of said drums and opposed end walls spaced outwardly of the ends of said drums, and sealing means disposed between the ends of said outer drum and the end walls of said trough, said sealing means comprising annular sealing members, and tensioning means connected to said sealing members and a stationary portion of said apparatus for urging said sealing members into sealing engagement with the ends of said outer drum and the end walls of said trough.

12. An apparatus for high-degree dewatering of hydrous substances such as fibrous pulp suspensions, said apparatus comprising an inner rotary screen drum, an outer rotary screen drum, said inner drum being disposed eccentrically within said outer drum, said drums having substantially parallel axes and defining between them a nip, means for urging said outer drum toward said inner drum along said nip, means for supplying a hydrous substance into said outer drum, rotation of said drums serving to feed said substance between said drums at said nip to comprise said substance and remove water therefrom, means for removing the dewatered substance and the water removed therefrom, said outer drum comprising a thin screen casing and stiffening means on the outer surface of said casing, at least certain portions of said stiffening means adjacent the surface of said casing extending substantially circumferentially thereof, said inner drum means on each end of one of said drums, stepped portions in the opposite ends of the other of said drums providing including a thin screen casing, radially projecting flange annular recesses for receiving said flange means, said flange means having a greater radial extent than said recesses, whereby said flange means will contact a wall of said recesses to prevent direct contact between the screen casings of said drums.

13. An apparatus for high-degree dewatering of hydrous substances such as fibrous pulp suspensions, said apparatus comprising an inner rotary screen drum, an outer rotary screen drum, said inner drum being disposed eccentrically within said outer drum, said drums having substantially parallel axes and defining between them a nip, means for urging said outer drum toward said inner drum along said nip, means for supplying a hydrous substance into said outer drum, rotation of said drums serving to feed said substance between said drums at said nip to compress said substance and remove water therefrom, means for removing the dewatered substance and the water removed therefrom, said outer drum comprising a thin screen casing and stiffening means on the outer surface of said casing, at least certain portions of said stiffening means adjacent the surface of said casing extending substantially circumferentially thereof, and a stationary liquid supply means disposed within said outer drum upstream from said nip, said liquid supply means comprising a conduit of stream-lined cross section extending substantially throughout the entire length of said outer drum.

14. An apparatus for high-degree dewatering of hydrous substances, such as fibrous pulp suspensions, said apparatus comprising an inner rotary screen drum, an outer rotary screen drum, said inner drum being disposed eccentrically within said outer drum, said drums having substantially parallel axes and defining between them a nip, means for urging said outer drum toward said inner drum along said nip, means for supplying a hydrous substance into said outer drum, rotation of said drums serving to feed said substance between said drums at said nip to compress said substance and remove water therefrom, means for removing the dewatered substance and the water removed therefrom, and a stationary liquid supply means disposed within said outer drum upstream from said nip, said liquid supply means comprising a conduit of stream lined cross section extending substantially throughout the entire length of said outer drum.

References Cited by the Examiner
UNITED STATES PATENTS

| | | | |
|---|---|---|---|
| 358,974 | 3/1887 | Grimm | 100—121 |
| 390,651 | 10/1888 | Crawford | 100—121 X |
| 958,068 | 5/1910 | Arbuckle | 100—174 X |
| 1,241,905 | 10/1917 | Behr | 100—121 X |
| 2,044,386 | 6/1936 | Goding | 100—121 X |
| 2,715,871 | 8/1955 | Dosne et al. | 100—131 |
| 2,749,302 | 6/1956 | Trebler et al. | 210—402 X |
| 3,000,294 | 9/1961 | Lowe | 100—121 |
| 3,002,622 | 10/1961 | Mathewson | 210—403 X |
| 3,029,948 | 4/1962 | McKay | 210—402 X |
| 3,086,454 | 4/1963 | Asplund | 100—121 |

FOREIGN PATENTS 96,482   8/1939   Sweden.

WALTER A. SCHEEL, *Primary Examiner.*
LOUIS O. MAASSEL, *Examiner.*